United States Patent
Kamp et al.

(10) Patent No.: US 9,964,212 B2
(45) Date of Patent: May 8, 2018

(54) WEAR RESISTANT INSERT FOR PNEUMATIC SCOTCH YOKE PISTON

(71) Applicant: Hamilton Sundstrand Corporation, Windsor Locks, CT (US)

(72) Inventors: Josh Kamp, Glastonbury, CT (US); Scott W. Simpson, Easthampton, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 365 days.

(21) Appl. No.: 14/794,282

(22) Filed: Jul. 8, 2015

(65) Prior Publication Data
US 2017/0009883 A1    Jan. 12, 2017

(51) Int. Cl.
| F16J 1/14 | (2006.01) |
| F16K 31/163 | (2006.01) |
| F15B 15/06 | (2006.01) |
| F16J 1/00 | (2006.01) |
| F16J 1/02 | (2006.01) |

(52) U.S. Cl.
CPC .............. *F16J 1/14* (2013.01); *F15B 15/066* (2013.01); *F16J 1/005* (2013.01); *F16J 1/02* (2013.01); *F16K 31/1635* (2013.01)

(58) Field of Classification Search
CPC ....... F16J 1/02; F16J 1/005; F16J 1/14; F15B 15/066; F16K 31/1635
USPC .......................................................... 92/138
See application file for complete search history.

(56) References Cited

U.S. PATENT DOCUMENTS

| 4,559,838 A | * | 12/1985 | Neuenschwander ... | F01B 9/023 403/13 |
| 5,000,077 A | * | 3/1991 | Habicht ................ | F15B 15/066 74/104 |
| 5,445,039 A | * | 8/1995 | Brackett ................. | F01B 9/023 184/6.5 |
| 5,575,173 A | * | 11/1996 | Brackett ................. | F01B 9/023 184/6.5 |
| 5,700,094 A | * | 12/1997 | Dam ...................... | F04B 1/148 384/492 |
| 6,302,665 B1 | * | 10/2001 | Esumi .................... | F01C 21/08 418/178 |
| 2004/0129906 A1 | | 7/2004 | Authelet et al. | |
| 2014/0072802 A1 | * | 3/2014 | Stefanescu .............. | C09D 5/03 428/402 |

OTHER PUBLICATIONS

Extended European Search Report for EP Application No. 16178405.3, dated Dec. 2, 2016, 6 pages.

* cited by examiner

*Primary Examiner* — Thomas E Lazo
(74) *Attorney, Agent, or Firm* — Kinney & Lange, P.A.

(57) ABSTRACT

A piston assembly includes a piston cross-member having a first end disposed opposite a second end. The piston assembly also includes a first cap disposed on the first end of the piston cross-member, and a second cap disposed on the second end of the piston cross-member. A slot is formed in the piston cross-member transverse to a length of the piston cross-member. An insert is disposed in the slot, wherein the insert is a wear article configured to contact a crank.

14 Claims, 3 Drawing Sheets

WEAR RESISTANT INSERT FOR PNEUMATIC SCOTCH YOKE PISTON

BACKGROUND

This disclosure is directed generally to butterfly valves, and more specifically, to pistons used for actuation of butterfly valves.

Pneumatically actuated butterfly valves require a means for converting the axial motion of the piston into rotary motion to control the position of the valve disc which is used to modulate a primary air flow. Typically a link with bearings at each end provides the connection between the piston and the crank arm which rotates the shaft for the butterfly disc. Often there are wear issues associated with the bearings at either end of the crank. Also, in high vibration environments like engine bleed systems, a piston torsional mode may be excited which leads to excessive piston ring wear. In such arrangements, the piston has the rotational inertia and the link provides the torsional stiffness.

SUMMARY

In one aspect of the invention, a piston assembly includes a piston cross-member having a first end disposed opposite a second end. The piston assembly also includes a first cap disposed on the first end of the piston cross-member, and a second cap disposed on the second end of the piston cross-member. A slot is formed in the piston cross-member transverse to a length of the piston cross-member. An insert is disposed in the slot, wherein the insert is a wear article configured to contact a crank.

In another aspect of the invention, an actuator assembly includes a piston assembly. The piston assembly includes a piston cross-member comprising a first end disposed opposite a second end. A first cap is disposed on the first end of the piston cross-member, and a second cap is disposed on the second end of the piston cross-member. A slot is formed in the piston cross-member transverse to a length of the piston cross-member, and an insert disposed in the slot.

Persons of ordinary skill in the art will recognize that other aspects and embodiments of the present invention are possible in view of the entirety of the present disclosure, including the accompanying figures.

Figure 1:
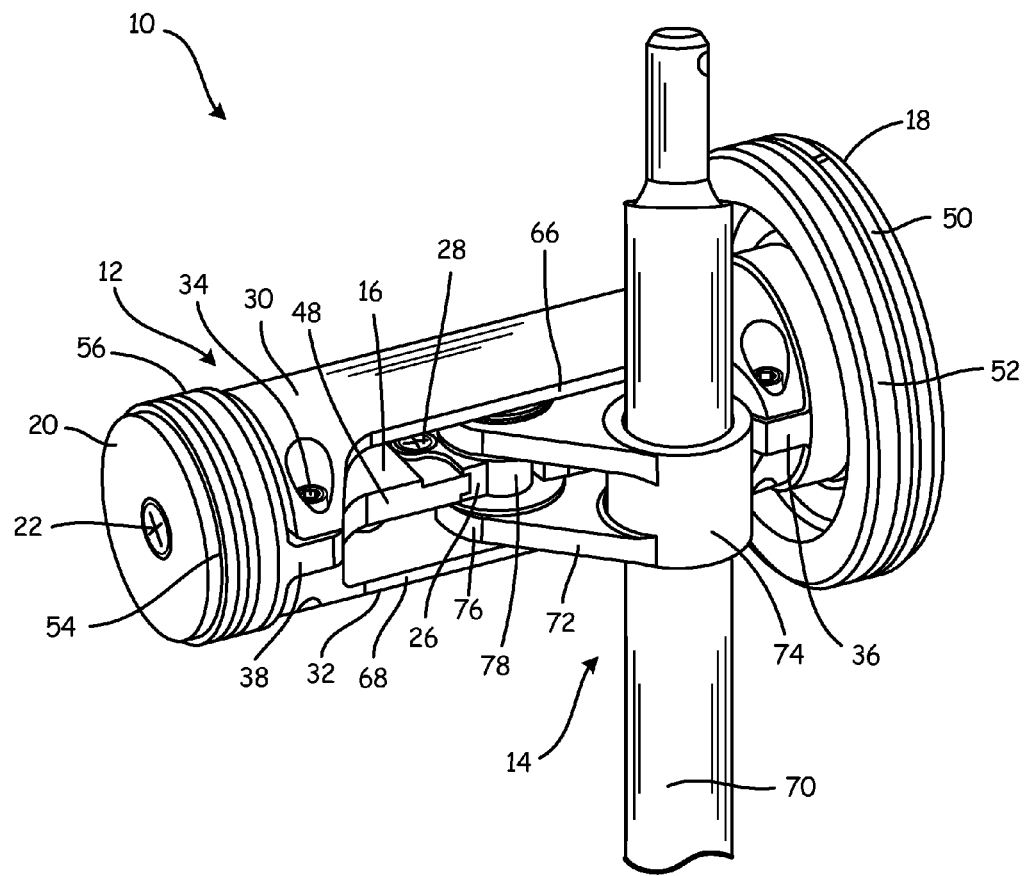
FIG. 1 is a perspective view of a piston assembly with a crank mechanism.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

The present disclosure provides an actuator assembly that includes a piston assembly and a crank mechanism. The piston assembly includes a slot and a wear-resistant insert disposed in the slot. The wear-resistant insert engages the crank mechanism and helps reduce the amount of wear experienced by the rest of the components of the piston assembly during operation of the piston assembly and the crank mechanism.

Figure 2:
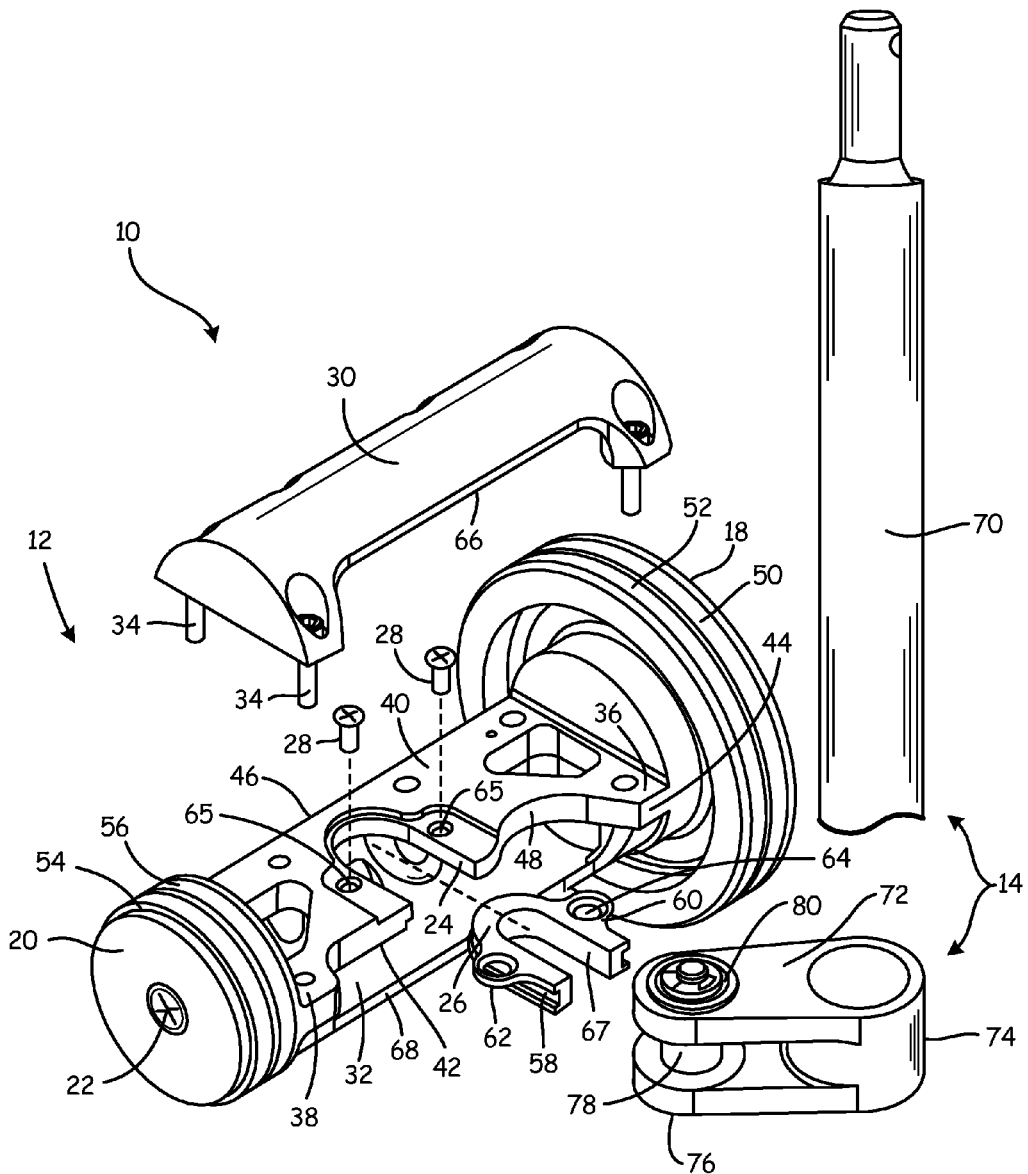
FIG. 2 is an exploded perspective view of the piston assembly and crank mechanism from FIG. 1.
Figure 3:
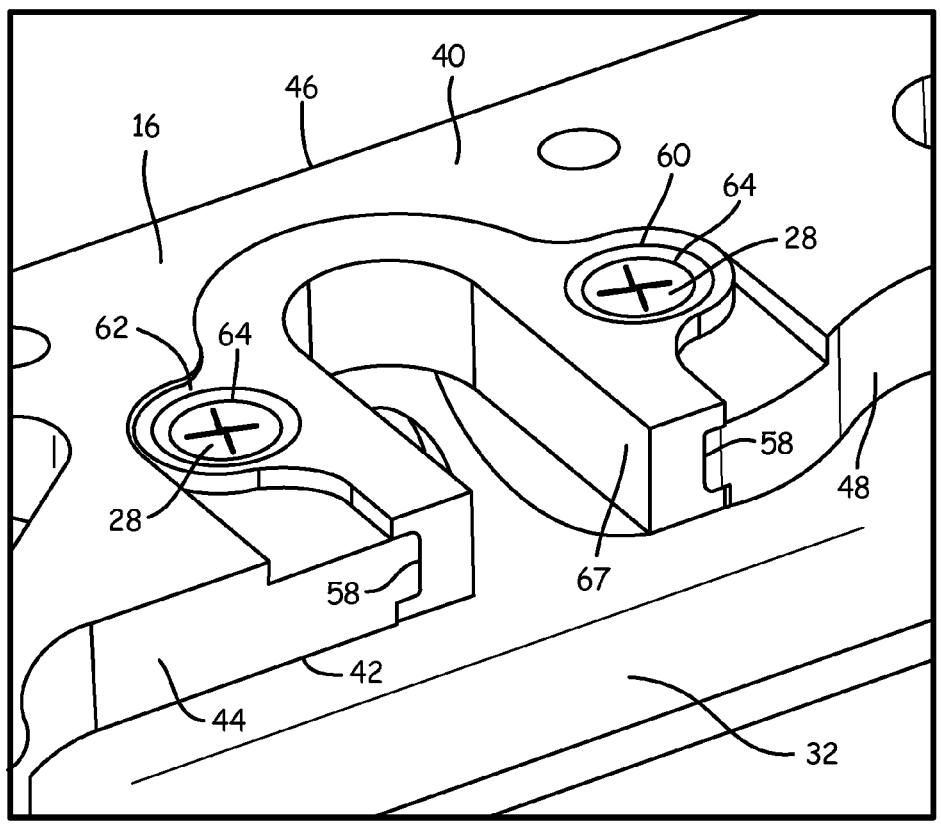
FIG. 3 is perspective view of an insert of the piston assembly from FIG. 1.

FIGS. 1-3 will be discussed concurrently. FIG. 1 is a perspective view of actuator assembly 10. FIG. 2 is an exploded perspective view of actuator assembly 10, and FIG. 3 is a perspective view of insert 26 of actuator assembly 10. Actuator assembly 10 can be used in a pneumatic butterfly valve for use in engine bleed air systems and/or other types of fluid valve arrangements. Actuator assembly 10 can include piston assembly 12 and crank mechanism 14. Piston assembly 12 can include piston cross-member 16, first cap 18, second cap 20, cap fasteners 22, slot 24, insert 26, insert fasteners 28, first cover 30, second cover 32, and cover fasteners 34. Piston cross-member 16 can include first end 36, second end 38, first side 40, second side 42, third side 44, fourth side 46, and cross-member cutout 48. First cap 18 can include first piston ring 50 and first rider ring 52. Second cap 20 can include second piston ring 54 and second rider ring 56. Insert 26 can include a C-channel cross-sectional profile with channel 58. Insert 26 can further include first flange 60, second flange 62, and holes 64. First cover 30 can include first cutout 66 and second cover 32 can include second cutout 68. Crank mechanism 14 can include shaft 70, crank 72 with first end 74 and second end 76, and crank pin 78.

First end 36 of piston cross-member 16 is disposed opposite second end 38 of piston cross-member 16. A length of piston cross-member 16 is defined as the distance between first end 36 and second end 38 of piston cross-member 16. First side 40 of piston cross-member 16 can be disposed opposite second side 42 of piston cross-member 16. Third side 44 of piston cross-member 16 can be disposed opposite fourth side 46 of piston cross-member 16. First side 40 and second side 42 of piston cross-member 16 can be perpendicular to third side 44 and fourth side 46 of piston cross-member 16. First side 40 and second side 42 can also be wider than third side 44 and fourth side 46 such that piston cross-member 16 is relatively flat.

First cap 18 can be attached to first end 36 of piston cross-member 16 and second cap 20 can be connected to second end 38 of piston cross-member 16. First cap 18 and second cap 20 can be connected to piston cross-member 16 by various attachment means, which may include threaded engagement, brazing, welding, and/or other types of mechanical or chemical adhesion. In the embodiment shown in FIGS. 1 and 2, first cap 18 and second cap 20 are connected to piston cross-member 16 by threaded cap fasteners 22 (only one of which is shown in FIGS. 1-2). First piston ring 50 and first rider ring 52 can be disposed around first cap 18, and second piston ring 54 and second rider ring 56 can be disposed around second cap 20. First piston ring 50, first rider ring 52, second piston ring 54, and second rider ring 56 can be used during operation of actuator assembly 10 to form a seal between a valve housing (not shown) and piston assembly 12 to reduce the likelihood of pressure losses across piston assembly 12.

Slot 24 is formed in piston cross-member 16 between first end 36 and second end 38 of piston cross-member 16 such that slot 24 is transverse to the length of piston cross-member 16. As shown in FIG. 2, slot 24 can extend completely through first side 40 and second side 42 of piston cross-member 16, and can extend through third side 44 of piston cross-member 16 such that slot 24 is open on third side 44 to receive both insert 26 and crank pin 78 of crank mechanism 14. Slot 24 can be U-shaped.

Insert 26 is disposed in slot 24 and, similar to slot 24, can be open to receive crank pin 78 of crank mechanism 14. Crank mechanism 14 can be disposed proximate to third side 44 of piston cross-member 16, thus slot 24 and insert 24 can both be open to third side 44 of piston cross-member 16. Both slot 24 and insert 26 are closed to fourth side 46 of piston cross-member 16. As shown best in FIGS. 2-3, insert 26 can also be U-shaped. First flange 60 and second flange 62 can be used to mechanically connect insert 26 to piston cross-member 16. As shown in FIGS. 2-3, first flange 60 can extend from insert 26 and can extend generally toward first cap 18. Second flange 62 can extend from insert 26 and can extend generally toward second cap 20 on an opposite side of insert 26 from first flange 60. Both first flange 60 and second flange 62 can include holes 64, holes 64 being configured to line-up with holes 65 (shown in FIG. 2) formed in piston cross-member 16 and configured to receive insert fasteners 28. Insert fasteners 28 can be a threaded fastener, such as a bolt. Both first flange 60 and second flange 62 can be disposed on first side 40 of piston cross-member 16 so that an operator need only access first side 40 of piston cross-member 16 to install or remove insert 26.

Insert 26 is a replaceable wear article configured to contact crank pin 78 of crank mechanism 14. To enhance the wear capabilities of insert 26, insert 26 can include a wear-resistant coating. The wear-resistant coating on insert 26 can be a physical-vapor-deposited coating of chromium nitride or any other material that increases the wear-resistance of insert 26. Insert 26 itself can be formed from any material that maintains adequate hardness at elevated operating temperatures, such as the nickel-cobalt alloy MP159®. As shown best in FIGS. 2-3, insert 26 can also include a C-channel cross-sectional profile. The C-channel cross-sectional profile of insert 26 can help insert 26 resist bending and deformation in the direction of the length of piston cross-member 16. Channel 58 of the C-channel cross-sectional profile of insert 26 can be formed on an outer surface of insert 26 that contacts piston cross-member 16 such that channel 58 also contacts piston cross-member 26. Inside surface 67 of insert 26 can be relatively smooth and receives crank pin 78.

Crank 72 is a crank arm with first end 74 affixed to shaft 70 and second end 76 connected to crank pin 78. Crank pin 78 can be connected to second end 76 by roller bearings 80 such that crank pin 78 is free to rotate about a longitudinal axis of crank pin 78. When crank mechanism 14 and piston assembly 12 are assembled together, crank pin 78 is received by insert 26. During operation, as piston assembly 12 translates axially back and forth along a longitudinal axis of piston assembly 12, crank pin 78 rotatably slides back and forth along inside surface 67 of insert 26. Because crank pin 78 can rotate, crank pin 78 does not cause as much wear on insert 26 that a conventional non-rotatable crank pin would cause on insert 26. Because crank pin 78 engages insert 26 and does not directly engage slot 24 and piston cross-member 16, the majority of the machine wear caused by the interaction between piston assembly 12 and crank mechanism 14 during operation is contained to insert 26 and crank pin 78. Both insert 26 and crank pin 78 are relatively cheaper and easier to replace than piston cross-member 16 and crank 72. Crank pin 78 can formed from the alloy Deloro™ 60, or any other material that maintains adequate hardness at elevated operating temperatures.

First cover 30 can be affixed to first side 40 of piston cross-member 16, and second cover 32 can be affixed to second side 42 of piston cross-member 16. As shown best in FIG. 2, both first cover 30 and second cover 32 can be detachable with piston cross-member 16 so as to allow an operator to access insert 26 should insert 26 need replacement. Cover fasteners 34 can be threaded fasteners, such as screws or bolts, that connect first cover 30 and second cover 32 to piston cross-member 16.

First cover 30 and second cover 32 provide an increase in stiffness to piston assembly 12 by absorbing and/or damping vibrations experienced by piston assembly 12 during operation of piston assembly 12. First cover 30 and second cover 32 dampen vibrations experienced by piston assembly 12 by adding support to piston cross-member 16 along the areas where first cover 30 and second cover 32 come into contact with piston cross-member 16. When assembled, piston cross-member 16, first cover 30, and second cover 32 can generally include a cylindrical shape, and may include other shapes designed to optimize the vibrational characteristics of piston assembly 12. The outer diameters of both first cover 30 and second cover 32 are slightly smaller than the width of piston cross-member 16 for a proper tolerance stack-up allowing piston assembly 12 to fit within a bore of a valve housing without coming into contact with the bore during operation of the valve.

Specifically, the addition of first cover 30 and second cover 32 increases the natural frequency of piston assembly 12. The natural frequency, or the frequency at which an object tends to oscillate in the absence of a driving or damping force, of piston assembly 12 without covers 30 and 32 can be between 100-1,150 hz. This can be a problem because the typical vibrational mode of the operating environment surrounding piston assembly 12 can include torsional modes within the range of 100-1,150 hz. When the natural frequency of piston assembly 12 falls within the torsional mode range of the operating environment, the amplitude of the torsional mode of piston assembly 12 can increase drastically causing potential wear and potential damage to piston assembly 12 and other components of piston assembly 12.

The addition of first cover 30 and second cover 32 to piston assembly 12 results in increasing a natural frequency of piston assembly 12 to at least 2,000 hz. Specifically, the natural frequency of piston assembly 12 may be increased to greater than 2,300 hz with the addition of first cover 30 and second cover 32 to piston assembly 12. A benefit of attaching first cover 30 and second cover 32 to piston assembly 12 is to increase the resonant frequencies associated with piston assembly 12 to well above any frequency source in the valve operating environment. This increase in natural frequency of piston assembly 12 significantly reduces the wear typically seen in high vibration environments where piston assembly 12 will be used and will also reduce piston ring wear and crank mechanism wear.

First cutout 66 and second cutout 68 can be formed on first cover 30 and second cover 32 respectively, and cross-member cutout 48 can be formed on piston cross-member 16. Together, first cutout 66, second cutout 68, and cross-member cutout 48 can provide an opening in first cover 30 and second cover 32 for second end 76 of crank 72 to enter into piston assembly 12 and engage with insert 26. Additionally, the opening created by first cutout 66, second cutout 68, and cross-member cutout 48 provide clearance for shaft 70 during actuation of actuator assembly 10. As can be seen best in FIG. 1, the shape of first cutout 66, second cutout 68, and cross-member cutout 48 allow shaft 70 to be positioned closer to piston assembly 12 than a conventional actuator assembly without interfering with an actuation path of piston assembly 12. Because first cutout 66, second cutout 68, and cross-member allow shaft 70 to be positioned closer to piston assembly 12, crank 72 can be shorter and lighter than crank arms in conventional actuator assemblies without comprising strength and durability.

Piston cross-member 16, first cap 18, second cap 20, first cover 30, second cover 32, shaft 70, and crank 72 can all include metal materials, such as INCONEL® alloy 718, INCONEL® alloy 625, steel, titanium, alloys, superalloys, and/or other various types of metals.

In view of the foregoing description, it will be recognized that the present disclosure provides numerous advantages and benefits. For example, the present disclosure provides piston assembly 12 with insert 26, first cover 30, and second cover 32. Insert 26 is configured to reduce the amount of wear experienced by the rest of piston assembly 12, thereby prolonging the life of the other components piston assembly 12. Should insert 26 wear out, insert 26 can be replaced without having to replace the more expensive components of piston assembly 12. First cover 30 and second cover 32 also increase the life of piston assembly 12 by raising the natural resonant frequencies of piston assembly 12 above the environmental frequencies experienced by piston assembly 12 during operation.

The following are non-exclusive descriptions of possible embodiments of the present invention.

In one embodiment, a piston assembly includes a piston cross-member having a first end disposed opposite a second end. The piston assembly also includes a first cap disposed on the first end of the piston cross-member, and a second cap disposed on the second end of the piston cross-member. A slot is formed in the piston cross-member transverse to a length of the piston cross-member. An insert is disposed in the slot, wherein the insert is a wear article configured to contact a crank.

The piston assembly of the preceding paragraph can optionally include, additionally and/or alternatively, any one or more of the following features, configurations and/or additional components:

the insert comprises a wear-resistant coating;

the wear-resistant coating on the insert is a physical-vapor-deposited coating of chromium nitride;

the insert is U-shaped;

the insert comprises a C-channel cross-sectional profile;

a channel of the C-channel cross-sectional profile of the insert contacts the piston cross-member;

a first cover affixed to a first side of the piston cross-member, the first cover including a first cutout; and a second cover affixed to a second side of the piston cross-member, the second cover including a second cutout, wherein the second side of the piston cross-member is disposed opposite the first side of the piston cross-member;

at least one of the first cover and the second cover is detachable with the piston cross-member; and/or a first flange extending from the insert and extending generally toward the first cap; and a second flange extending from the insert and extending generally toward the second cap, wherein the first flange and the second flange each comprise a hole configured to receive a threaded fastener, and wherein the first flange and the second flange of the insert are both disposed on the first side of the piston cross-member.

In another embodiment, an actuator assembly includes a piston assembly. The piston assembly includes a piston cross-member comprising a first end disposed opposite a second end. A first cap is disposed on the first end of the piston cross-member, and a second cap is disposed on the second end of the piston cross-member. A slot is formed in the piston cross-member transverse to a length of the piston cross-member, and an insert disposed in the slot.

The actuator assembly of the preceding paragraph can optionally include, additionally and/or alternatively, any one or more of the following features, configurations and/or additional components:

the insert is U-shaped;

the slot is U-shaped;

a crank mechanism comprising: a shaft; and a crank, wherein a first end of the crank is affixed to the shaft, and a second end of the crank is slidably and rotationally engaged with the insert disposed in the slot formed in the piston cross-member;

the slot and the insert are both open on a side of the piston cross-member nearest to the shaft;

a first flange extending from the insert and extending generally toward the first cap; and a second flange extending from the insert and extending generally toward the second cap, wherein the first flange and the second flange each comprise a hole configured to receive a retaining element; and/or the retaining element is a threaded fastener.

Any relative terms or terms of degree used herein, such as "substantially", "essentially", "generally", "approximately", and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example, while FIGS. 1-3 show first flange 60 and second flange 62 being disposed on first side 40 of piston cross-member 16, first flange 60 and second flange 62 could be alternatively disposed on second side 42 of third side 44 of piston cross-member 16. Furthermore, while FIGS. 1-3 show piston assembly 10 as an assembly of multiple components connected to one another by fasteners, piston cross-member 16, first cap 18, second cap 20, first cover 30, and second cover 32 of piston assembly 10 can alternatively be formed through an additive manufacturing process such that piston cross-member 16, first cap 18, second cap 20, first cover 30, and second cover 32 of piston assembly 10 are integral. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston assembly comprising:
    a piston cross-member comprising a first end disposed opposite a second end;
    a first cap disposed on the first end of the piston cross-member;

a second cap disposed on the second end of the piston cross-member;
a slot formed in the piston cross-member transverse to a length of the piston cross-member; and
an insert disposed in the slot, wherein the insert is a wear article configured to contact a crank, and wherein the insert is U-shaped.

2. The piston assembly of claim 1, wherein the insert comprises a wear-resistant coating.

3. The piston assembly of claim 2, wherein the wear-resistant coating on the insert is a physical-vapor-deposited coating of chromium nitride.

4. The piston assembly of claim 1, wherein the insert comprises a C-channel cross-sectional profile.

5. The piston assembly of claim 4, wherein a channel of the C-channel cross-sectional profile of the insert contacts the piston cross-member.

6. The piston assembly of claim 1, further comprising:
a first cover affixed to a first side of the piston cross-member, the first cover including a first cutout; and
a second cover affixed to a second side of the piston cross-member, the second cover including a second cutout, wherein the second side of the piston cross-member is disposed opposite the first side of the piston cross-member.

7. The piston assembly of claim 6, wherein at least one of the first cover and the second cover is detachable with the piston cross-member.

8. The piston assembly of claim 7, wherein the insert further comprises:
a first flange extending from the insert and extending generally toward the first cap; and
a second flange extending from the insert and extending generally toward the second cap,
wherein the first flange and the second flange each comprise a hole configured to receive a threaded fastener, and
wherein the first flange and the second flange of the insert are both disposed on the first side of the piston cross-member.

9. An actuator assembly comprising:
a piston assembly comprising:
a piston cross-member comprising a first end disposed opposite a second end;
a first cap disposed on the first end of the piston cross-member;
a second cap disposed on the second end of the piston cross-member;
a slot formed in the piston cross-member transverse to a length of the piston cross-member; and
an insert disposed in the slot, wherein the insert is U-shaped.

10. The assembly of claim 9, wherein the slot is U-shaped.

11. The assembly of claim 9, further comprising:
a crank mechanism comprising:
a shaft; and
a crank, wherein a first end of the crank is affixed to the shaft, and a second end of the crank is slidably and rotationally engaged with the insert disposed in the slot formed in the piston cross-member.

12. The assembly of claim 11, wherein the slot and the insert are both open on a side of the piston cross-member nearest to the shaft.

13. The assembly of claim 9, wherein the insert further comprises:
a first flange extending from the insert and extending generally toward the first cap; and
a second flange extending from the insert and extending generally toward the second cap,
wherein the first flange and the second flange each comprise a hole configured to receive a retaining element.

14. The assembly of claim 13, wherein the retaining element is a threaded fastener.

* * * * *